July 13, 1965 H. S. POLIN 3,194,003

SOLID STATE ELECTRONIC TIMEPIECE

Filed Nov. 13, 1963 11 Sheets-Sheet 1

HERBERT S. POLIN
INVENTOR.

BY
Hall, Pollock + Vande Sande
Attorneys

July 13, 1965 H. S. POLIN 3,194,003

SOLID STATE ELECTRONIC TIMEPIECE

Filed Nov. 13, 1963 11 Sheets-Sheet 2

HERBERT S. POLIN
INVENTOR.

BY
Wall, Pollock + Vande Sande
Attorneys

HERBERT S. POLIN
INVENTOR.

BY
Wall, Pollack + Vande Sande
Attorneys

July 13, 1965

H. S. POLIN 3,194,003

SOLID STATE ELECTRONIC TIMEPIECE

Filed Nov. 13, 1963

11 Sheets-Sheet 4

HERBERT S. POLIN

INVENTOR.

BY

Hall, Pollock & Vande Sande

Attorneys

July 13, 1965 H. S. POLIN 3,194,003

SOLID STATE ELECTRONIC TIMEPIECE

Filed Nov. 13, 1963 11 Sheets-Sheet 5

HERBERT S. POLIN

INVENTOR.

BY

Hall, Pollock + Vande Sande

Attorneys

HERBERT S. POLIN
INVENTOR.
BY
Hall, Pollock + Vande Sande
Attorneys

HERBERT S. POLIN
INVENTOR.

BY
Hall, Pollock + Vande Sande
Attorneys

HERBERT S. POLIN
INVENTOR.
BY
Hall, Pollock + Vande Sande
Attorneys

SOLID STATE ELECTRONIC TIMEPIECE

Filed Nov. 13, 1963 11 Sheets-Sheet 9

INVENTOR.
HERBERT S. POLIN
BY
Wall, Pollock & Vande Sande
Attorneys

SOLID STATE ELECTRONIC TIMEPIECE

HERBERT S. POLIN
INVENTOR.

BY
Hall, Pollock & Vande Sande
Attorneys

July 13, 1965 H. S. POLIN 3,194,003

SOLID STATE ELECTRONIC TIMEPIECE

Filed Nov. 13, 1963 11 Sheets-Sheet 11

HERBERT S. POLIN
INVENTOR.

BY
Hall, Pollock & Vande Sande
Attorneys 3,194,003

SOLID STATE ELECTRONIC TIMEPIECE

Herbert S. Polin, Geneva, Switzerland, assignor to P. Vogel and Company, Geneva, Switzerland, a corporation of Switzerland Filed Nov. 13, 1963, Ser. No. 323,503
12 Claims. (Cl. 58—50)

The present invention relates to electronic clocks and timepieces. It is an object of the invention to provide an electronic time measuring and display system comprising a prime frequency source, frequency dividing and decoding means, display means and time setting means, all combined in an integral encapsulation. More particularly, it is an object of the invention to provide an electronic timepiece which may be made small enough to be used as a wristwatch; and which eliminates completely all mechanical moving parts, including moving parts previously employed in the display portion of electronic timing mechanisms.

The accompanying drawings diagrammatically illustrate various embodiments of the present invention by way of example. Like numerals refer to like parts throughout.

Figure 2:
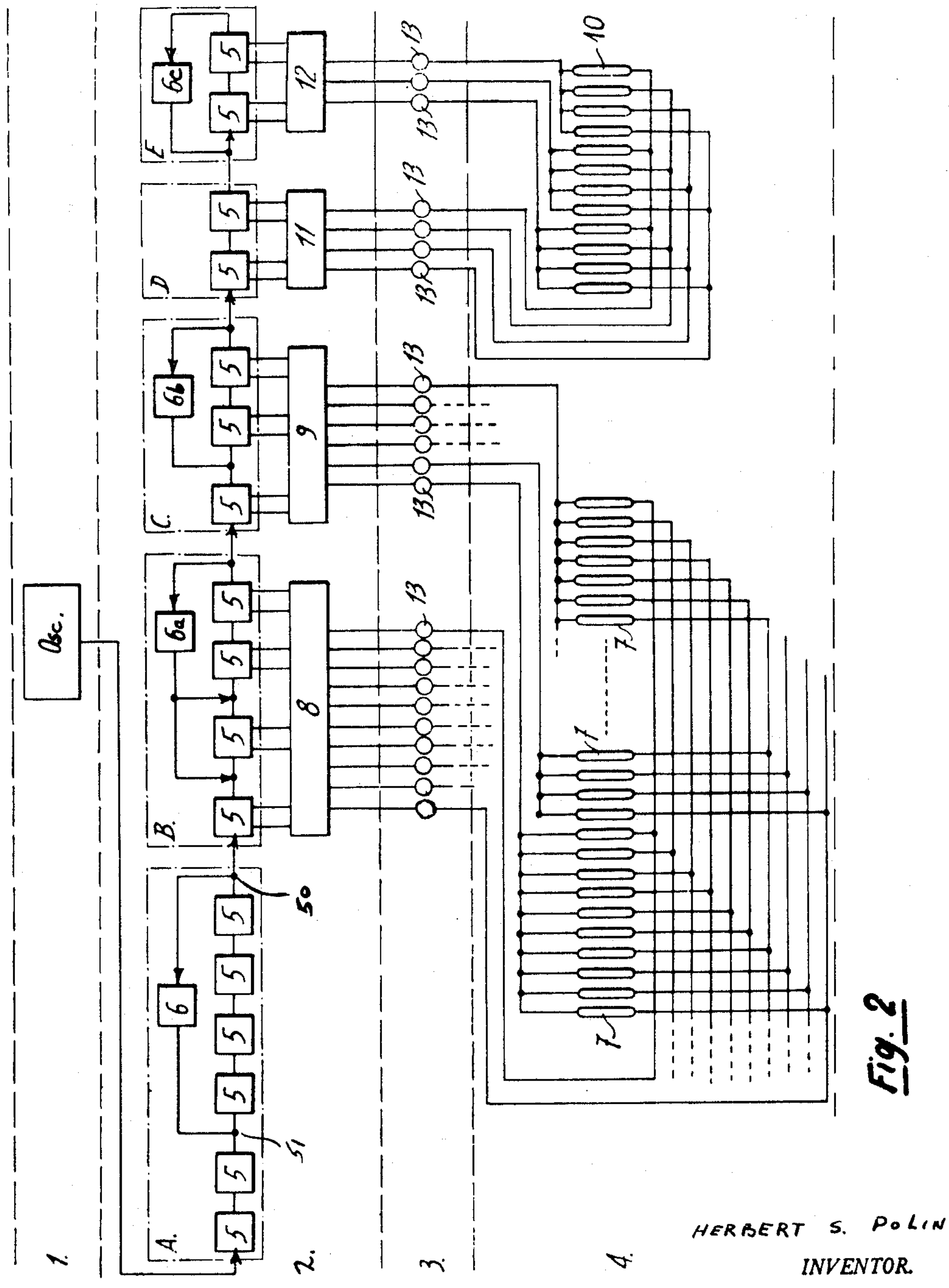
FIGURE 2 is a block circuit diagram for an electronic watch according to the invention, incorporating the semi-conductive layers of FIGURE 1.
Figure 3:
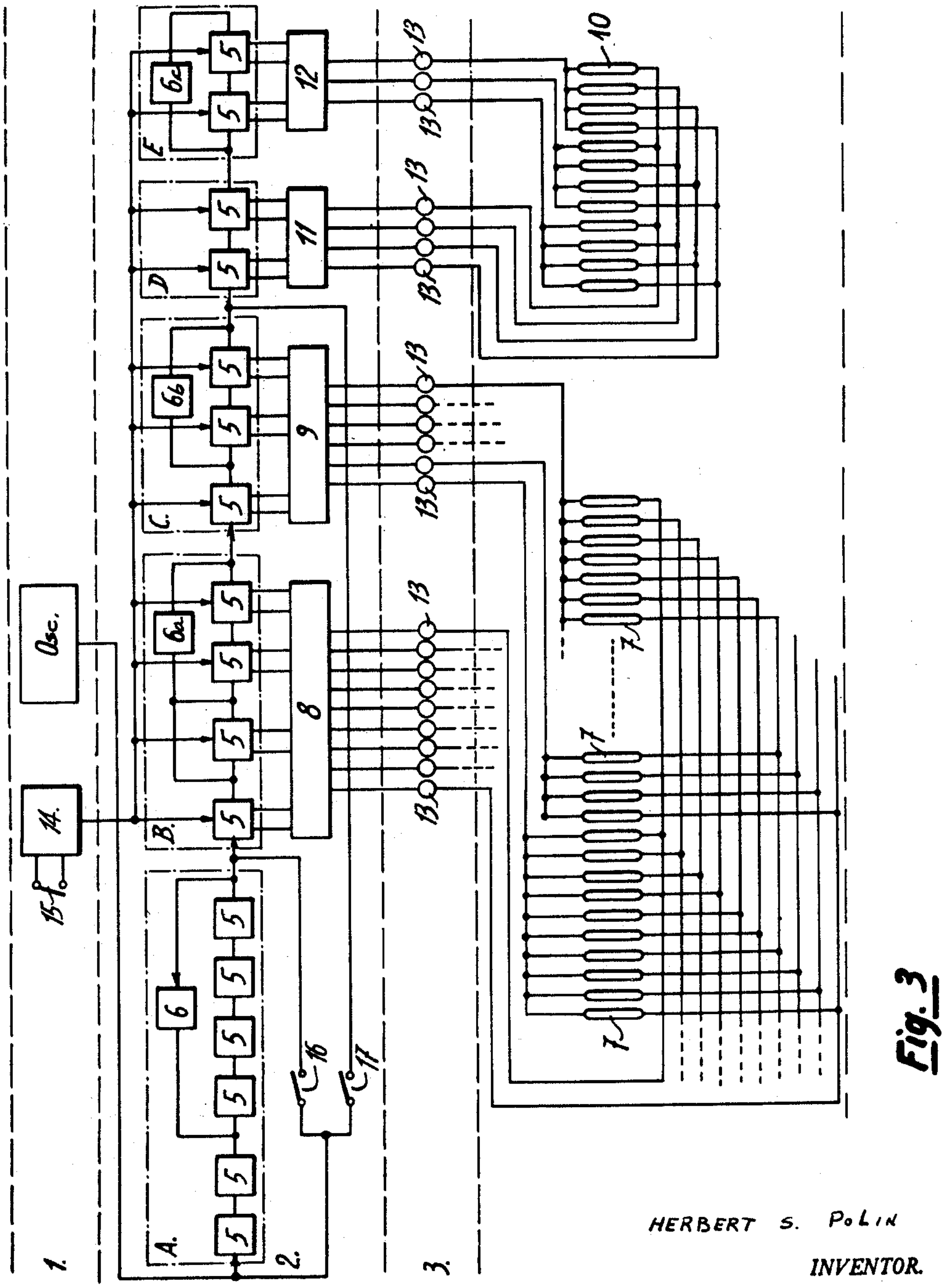
FIGURE 3 is a block circuit diagram similar to that in FIGURE 2, but relating to an electronic clock or watch, having a zero-return device.
Figure 10:
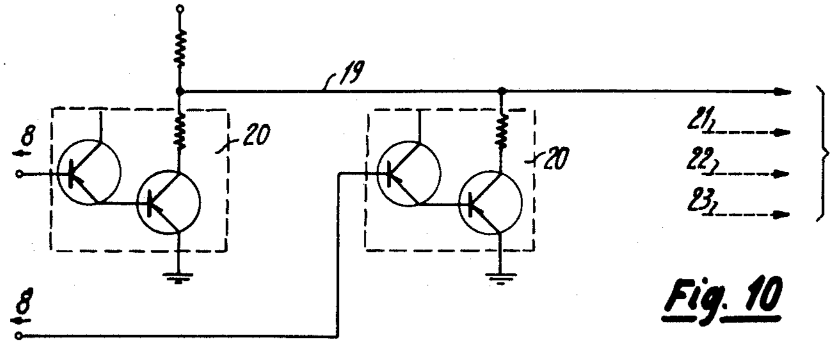
Figure 7:
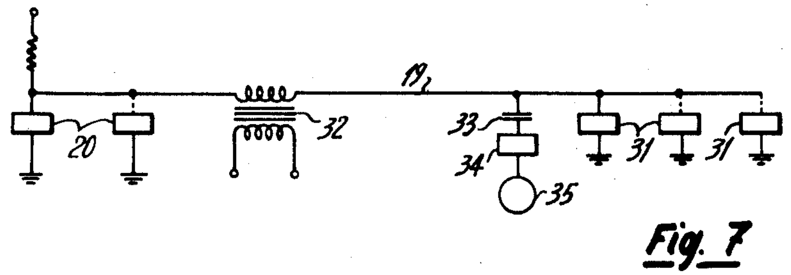
Figure 8:
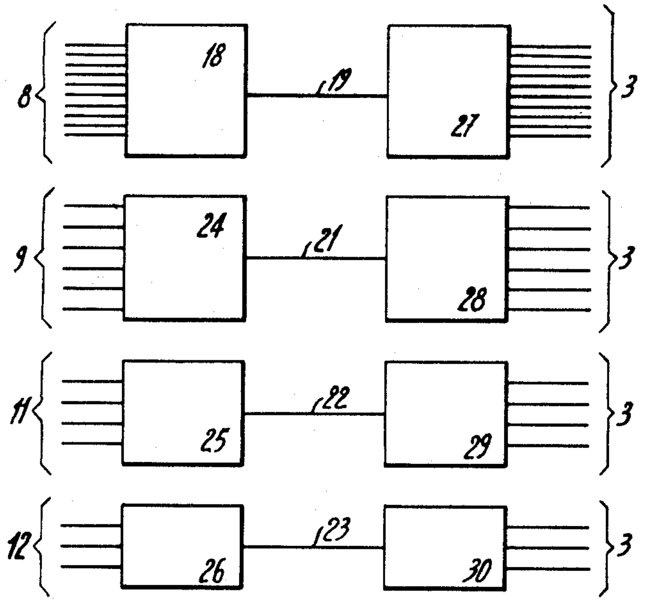
Figure 9:
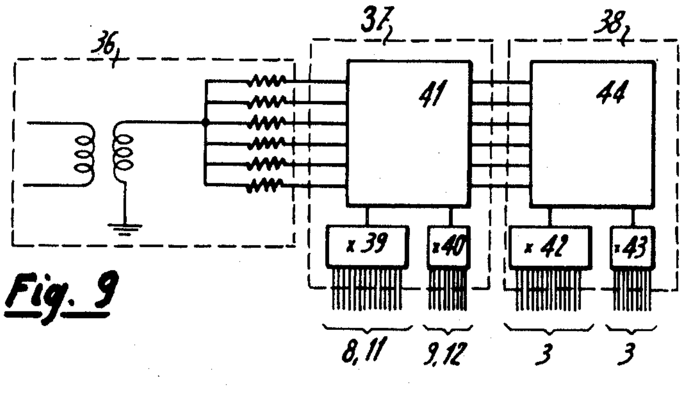
Figure 14:
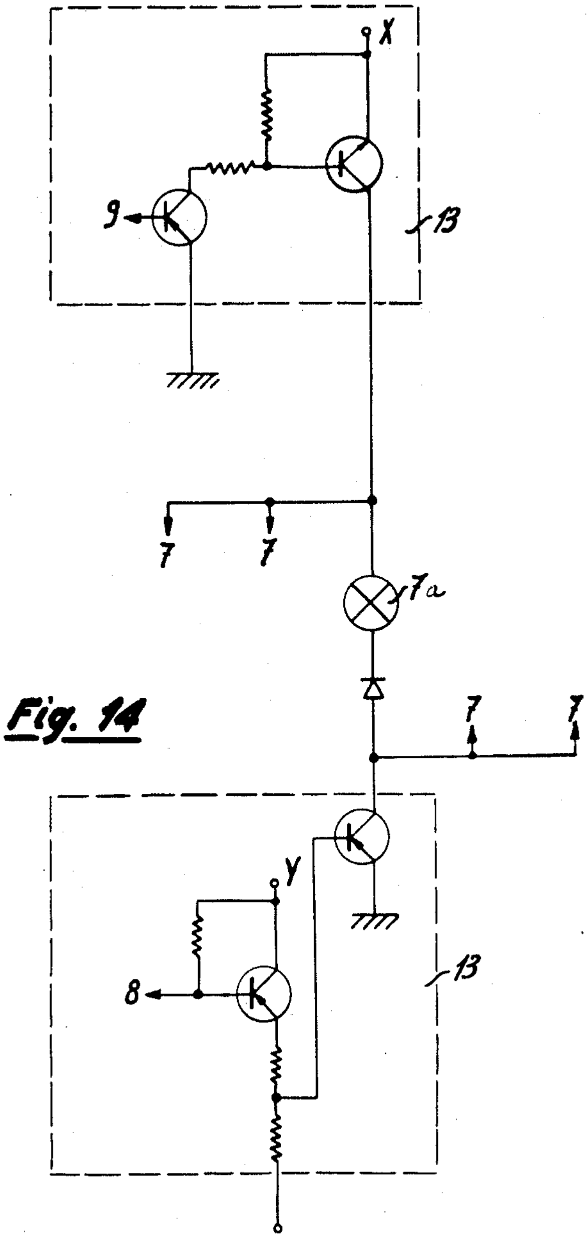
Figure 15:
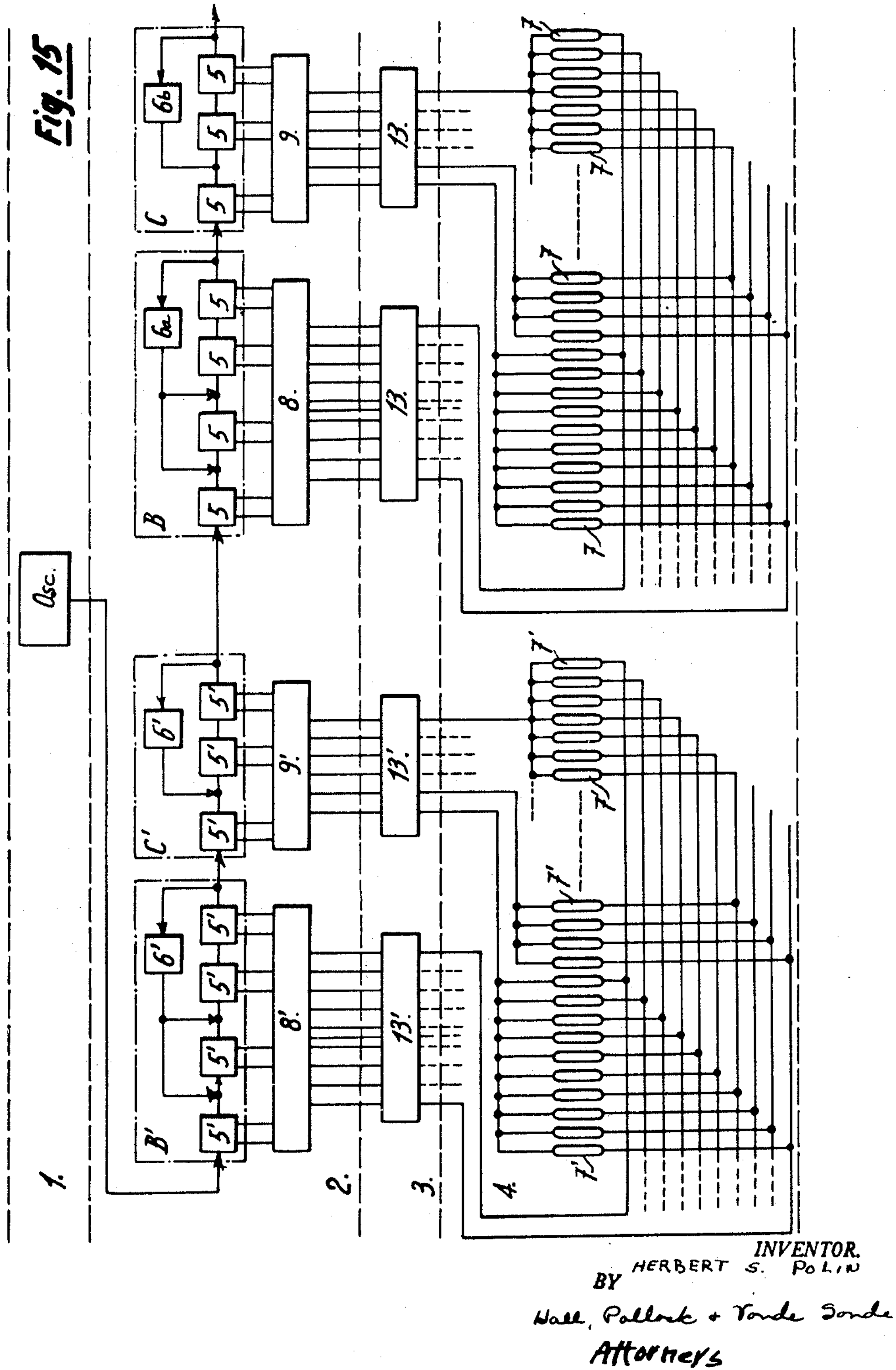
Figure 16:
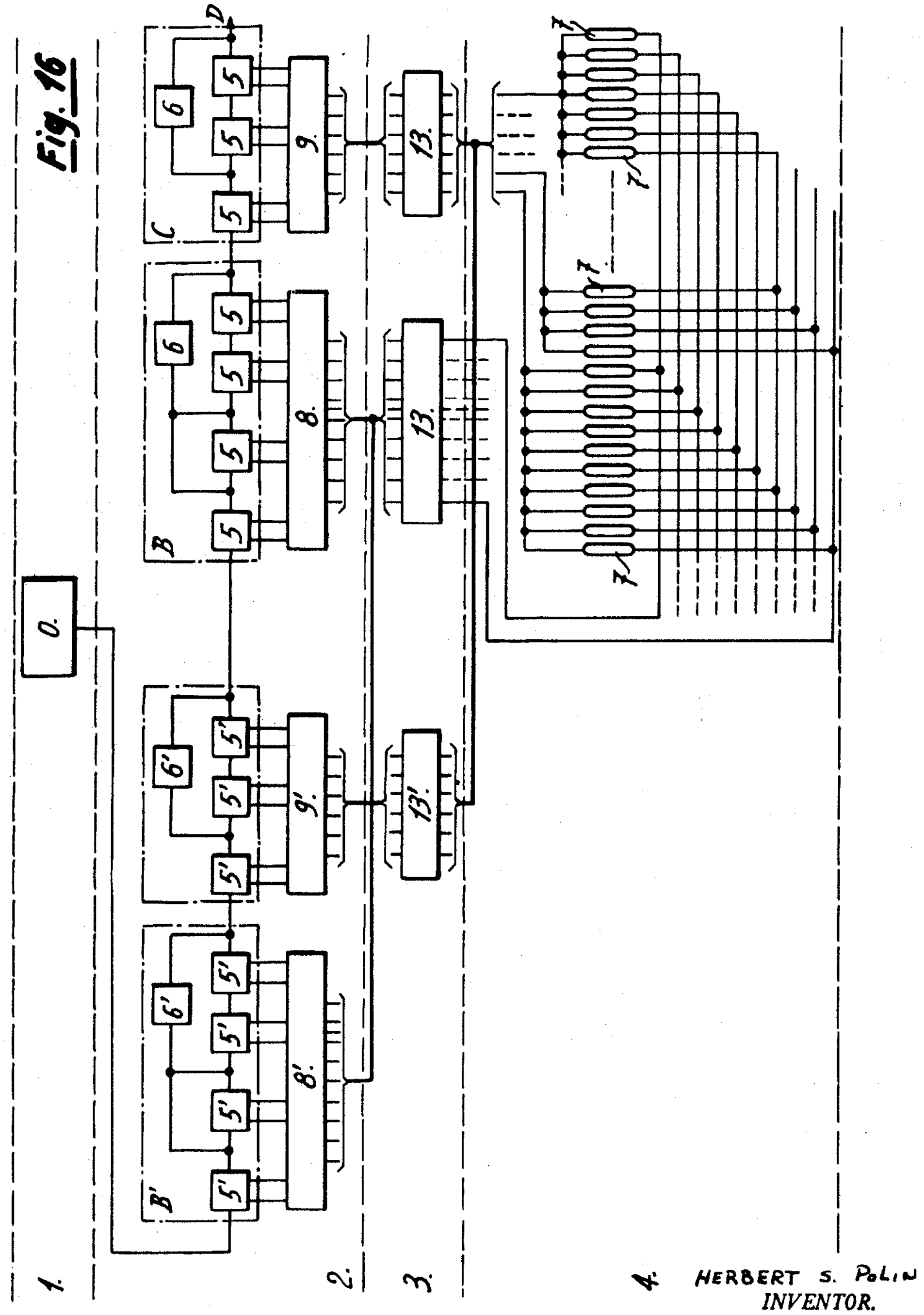
Figure 17:
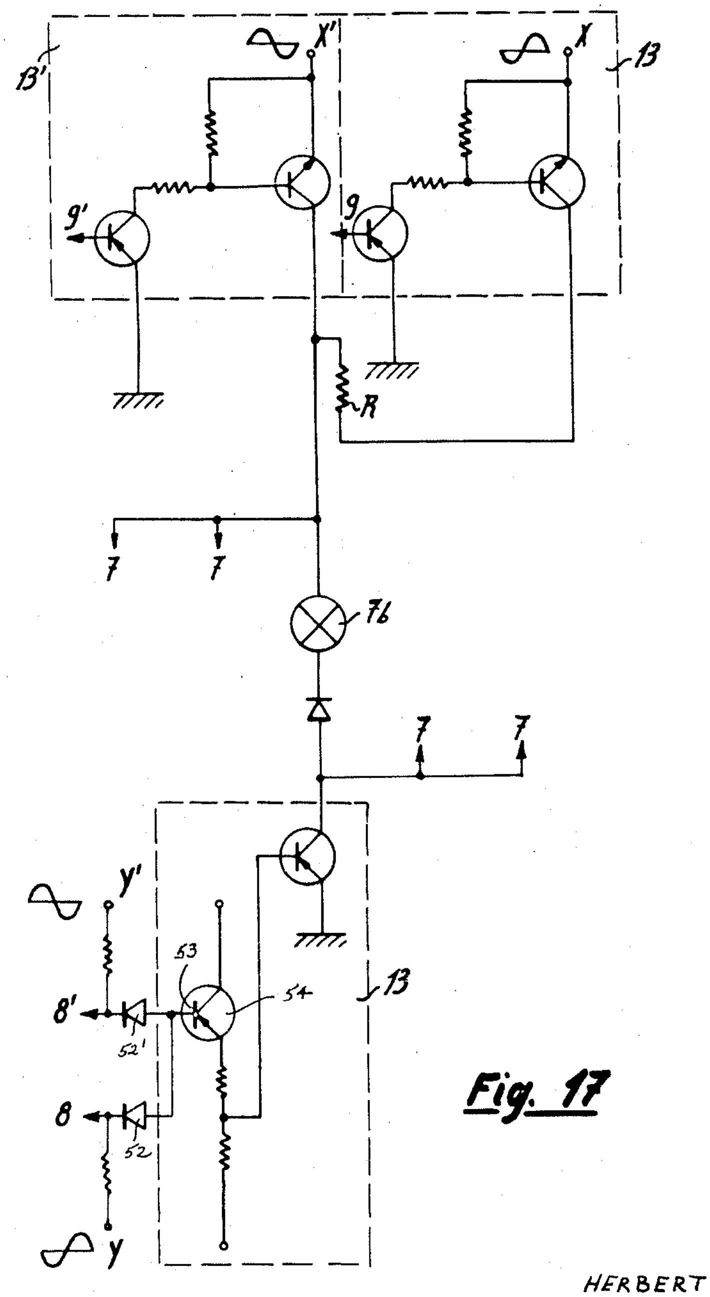

FIGURE 7 diagrammatically illustrates one form of circuit enabling seconds to be included in the display at a distance;

FIGURES 8 and 9 are block circuit diagrams according to the invention for coding and decoding circuits used for transmitting information from a master clock to a slave clock;

FIGURES 10, 11, 12 and 13 show details of the block circuits used in the embodiments illustrated in FIGURES 8 and 9;

FIGURE 14 shows details of a group of solid state electronic switching circuits used in the embodiments illustrated in FIGURES 2 and 3;

FIGURE 15 is a block diagram showing part of a modification of the electronic clock or watch illustrated in FIGURE 2, with provision for visual indication of seconds;

FIGURE 16 illustrates a modification of the electronic clock or watch shown in FIGURE 15, wherein a single indicator is used to represent both seconds and minutes; and FIGURE 17 shows details of a group of electronic switching circuits used in the form of the invention illustrated in FIGURE 16.

Figure 1:
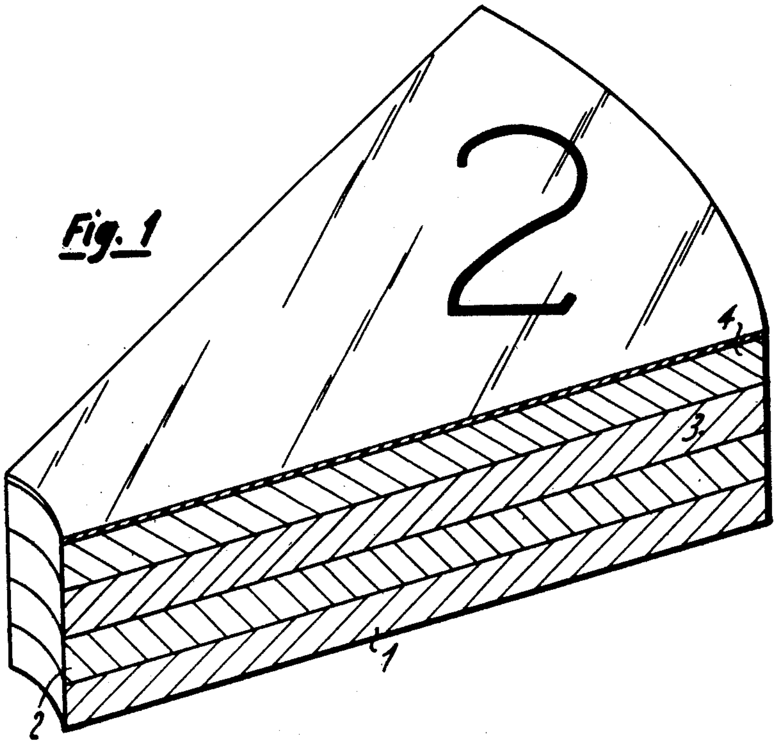
FIGURE 1 is a diagrammatic representation of a portion of an electronic watch constructed in accordance with the present invention, and comprising a plurality of semi-conductive layers.

An electronic watch such as illustrated in FIGURES 1 and 2 comprises various units, which for convenience can be termed an oscillator unit 1, a counting unit 2, a switching unit 3, and a display unit 4.

The oscillator unit 1 supplies a fixed frequency of one impulse per second. This fixed or reference frequency has to be very stable if the watch is to operate with a high degree of accuracy. The fixed or reference frequency used in oscillator 1 can take any of many forms already known per se, and conventionally employed in frequency determining circuits or in prior electronic timing devices, such as:

(a) A frequency generator using a standard frequency source, such as a tuning fork, a piezoelectric crystal or a "Solion" oscillator (see "Radio Engineers' Handbook," Section 6, "Crystal Oscillators," paragraph 4, edited by Terman and published by McGraw-Hill, 1943);

(b) A frequency dividing circuit supplied from the regular power supply mains, generally at fifty or sixty cycles per second; or (c) A combination of a frequency generator (a) and a frequency dividing circuit (b).

The oscillator unit 1, as will be described more fully hereinafter, takes the form of a thin layer, a sector of a thin layer, a block of semi-conductor material, etc., according to the miniaturization technique used. Such a thin layer or film of semi-conductor material can be appropriately constructed or fabricated to become capable of any preselected one of a variety of electronic functions (including the oscillator function mentioned). Although some of the features and processes to be described hereinafter are novel, such semi-conductor fabrication techniques are, in general, known to those skilled in the art. See, for example, "A Categorization of the Solid-State Device Aspects," Browillette and Glandi, Proceedings of the I.R.E., November 1960, pages 1833–1841; "Dolf-Micro-Electronics Program" by Prugh, Nall and Doctor, Proceedings of I.R.E., May 1959, pages 882–893 and the following article "The Micro-Module: A Logical Approach to Microminiaturization" by Danks, Doxey and McNaul.

In the example illustrated in FIGURE 2, the counting unit 2 is made up of seventeen binary units 5 connected in series. Each of the binary units 5 may comprise a conventional flip-flop unit employing two transistors.

The first group A of six flip-flop units, and the feed-back loop 6 interposed between the output 50 of this group and the input 51 of the third flip-flop 5, constitutes a dividing circuit emitting a signal at a frequency of one impulse per minute. These first six flip-flop units, in series, form a scale of sixty-four counter, the output of which is reduced to a scale of sixty since the feed-back loop 6 shunts the last four flip-flop units. As the first unit 5 is fed directly by the output signal from the oscillator 1 at a frequency of one cycle per second it emits an output signal at 50 of one impulse per minute.

In order that minutes can be indicated in a realistic manner, it is desirable to use sixty display members 7 grouped in a display unit 4, each of the members being energized in turn. The display members 7 may for example, be regularly distributed along one or more concentric circles reproducing the conventional appearance of a watch face, with sixty minute indications. A lesser number of indications, such as twelve, for example, may be used.

Other embodiments of the invention may provide a digital display, e.g., "11:06," in which case the display members will be arranged differently.

In order to reduce the number of elements and connections required, the principle of subdivision may be employed. The example illustrated in FIGURE 2 shows six sub-divisions each comprising ten minutes. An arrangement of this type makes it possible to reduce the number of components used to a minimum, and to simplify the connections of a numerical display device.

The second group B of four flip-flop units 5 in series forms a scale of sixteen counter, the output of which is reduced to a scale of ten by a second feed-back loop *6a*, which is connected as shown to shunt the last three as well as the last two units 5 of the group B. This second group B forms the minute counter.

The third group C of three flip-flop units 5 in series constitutes a scale of eight counter, the output of which is reduced to a scale of six by a third feed-back circuit *6b*, which shunts the last two units 5 of this group. This third group C constitutes the minutes subdivision counter.

In other embodiments, the number of subdivisions could obviously be other than six, more or less, subject to consideration either of economy or of ease in constructing the circuit.

The forms which display members 7 may take will be described hereinafter; but, in general, each such display member may include a switching circuit. At any moment, the information determining which of the sixty display members 7 is to be energized is contained in binary form in the second and third counting groups B and C of FIGURE 2. This necessitates using converters or selection devices, such as 8, 9, 11, and 12, between the output of the various counters and the switching circuits of the display device; and the selection devices operate to control the energization of the display members 7. The converters 8 and 9 transform the binary information in the counters B and C into numerical information, the numbers being from 1 to 10 for the counter B and from 1 to 6 for the counter C. The converters 8 and 9 are, in themselves, known in the art; and are made up of forty-four coincidence members, which may take the form of electronic switches.

In order to indicate the hours in a realistic manner, it is necessary to use twelve display members 10 grouped in the display unit or layer 4 and each being fed in turn. Here again the principle of subdivision is used in order to reduce the number of members required. In the example illustrated in FIGURE 2, three divisions of four hours each are used.

The counting unit or layer 2 also includes counters for the hours, provided by fourth and fifth groups D and E of two flip-flop units 5 in series. The group D forms a scale of four counter, while the group E forms a scale of three counter by means of a fourth feed-back circuit *6c* shunting its two flip-flop units. The group D constitutes the hour counter, and the group E constitutes the hour division counter.

Here again, it is necessary to provide converters to convert the information from the binary form supplied by the counters D and E to the desired numerical form, thereby to determine at each moment which of the twelve display members 10 is to be actuated.

The converter 11 associated with the counter group D, and the converter 12 associated with the counter group E, have coincidence members with the first coincidence member supplying numerical information from 1 to 4 relating to an hour sector (encompassing three different hours) and with the second coincidence member providing numerical information from 1 to 3 identifying a particular hour within the particular sector selected by the first coincidence member.

The converters 11 and 12 together constitute sixteen elements which may be in the form of electronic switches or of any other equivalent miniaturized circuit.

The counting unit or layer 2 may thus be divided into a counting unit proper A-B-C-D-E, and a converting unit 8, 9, 11, 12.

The switching unit of layer 3 comprises 23 electronic commutators or switches 13 of which 16 are responsible for controlling the minutes display and the other 7 for controlling the hour display. Each output of the converters 8, 9, 11 and 12 feeds the circuit energizing a particular electronic switch 13, in such a way as to control the display of minutes and of the hour respectively as a function of the information received from the counting means.

In the embodiment of FIGURE 2, the commutators or switches 13 may, for example, take the form illustrated in FIGURE 14. These circuits are known per se. It should be noted that the points X and Y of the switching circuits 13 shown in FIGURE 14 have a direct voltage applied to them, so that the switching circuits are at all times able to transmit information received from one of the converters. FIGURE 14 shows how two such switching circuits 13 are connected to a given display member *7a*; and possible connections to one side of other display members 7 are also shown, it being understood that the other sides of these other members 7 would be similarly switched by the switches 13. As already mentioned, the display layer 4 comprises sixty minute-display members 7, and twelve hour-display members 10. In this example, the display members are in the form of miniature incandescent lamps.

Each display member 7, 10 is connected to one side of a source of energy by means of a particular switch 13 corresponding to the division to which it belongs, and the other side of the source of energy is connected to the display member by means of another switch 13 corresponding to the ordinal number of the minute and hour respectively of the display member provided inside the division. In this way, the only display member 7, 10 operated at any given moment is the one which is connected to two switches 13, both in their conductive state.

The display members 7, 10 could obviously be in the form of neon lamps or electroluminescent elements. Photo-diode relays may be used, in one variant of the system, to trigger the display elements.

The device described may use batteries or other power supply. In one embodiment of the invention, presently available commercially in Europe, a source supplying a voltage of approximately −6 volts at 0.2 amp and +6 volts at 0.05 amp is used to power the watch. On the other hand, a source of which the type and power are determined by the type of display used, may be provided.

The electronic watch described operates as follows:

The oscillator 1 supplies a signal of one cycle per second (or other frequency), which is divided by the first group A of the counting unit 2, so as to give a signal of a frequency of one cycle per minute. This signal feeds the counter groups B, C, D and E, so that the converter 8 emits a signal to each of its ten outputs successively, for one minute each; the converter 9 emits a signal to each of its six outputs, successively, for ten minutes each; the converter 11 emits a signal to each of its four outputs successively, for one hour each; and finally, the converter 12 emits the signal to each of its three outputs successively for four hours each. This distribution of signals enables the display members 7 to be successively operated or switched at the rate of 1 per minute, while the display members 10 are successively operated or switched at the rate of 1 per hour.

The above embodiment has been described by way of example, and it is obvious that other variants could be provided. In particular, the number of the subdivisions could be different, although the number adopted in this case enables the number of members used to be reduced to a minimum.

In some modifications, it is desirable not only for the minutes and hours, but also for the seconds, to be visually indicated. A modification of this type is illustrated in FIGURE 15. Here the first group A of six flip-flops in the counting unit 2 in the FIGURE 2 embodiment has been replaced by a structure (B′, C′) similar to that of the groups B and C of the counting unit 2. This also allows division by 60 and thus gives an output signal of one cycle per minute.

However, with the aid of the groups B′, C′, it is possible to feed a structure (8′, 9′, 13′, 7′) similar to the FIGURE 2 structure comprising the converters 8, 9, the switches 13 and the display members 7, so that the seconds can be indicated visually. The assembly in FIGURE 15 would obviously be followed by a section for indicating hours, made up of the groups D and E and the members fed by these groups, all as described in reference to FIGURE 2. This results in an electronic watch comprising a counting unit 2, a commutation unit 3 and a display unit 4, each comprising a first structure relating to seconds; another identical structure relating to minutes; and a third structure, different from the first two, relating to hours.

The operation of this watch is similar to that of the embodiment previously described in reference to FIGURE 2, although the divider group A in FIGURE 2 is replaced, in the embodiment of FIGURE 15, by a second-counting group B′–C′ feeding a second-display device 7′.

It is possible to use only one group of display members to indicate both seconds and minutes. A modification of this type is illustrated diagrammatically in FIGURES 16 and 17. This modification has the great advantage of very appreciably reducing the number of components, by eliminating the group of switches 13′ fed by the seconds converter 8′ and all the seconds-display members 7′, utilized in the embodiment of FIGURE 15.

The minutes and seconds displays are superposed in the embodiment of FIGURES 16 and 17; and the single display group used to indicate both seconds and minutes is switched alternately from the seconds group to the minutes group, and vice versa; and displays of different brightness can, if desired, be used to markedly differentiate between seconds and minutes. In order that the (human) observer may not notice this switching but will only see the seconds and minutes displayed simultaneously, the switching frequency is set high enough to take advantage of the phenomenon of persistence of vision. As the persistence of vision is about $\frac{1}{20}$ of a second, a frequency of 50 or 60 cycles per second may, for example, be so used as the switching frequency.

The modification described above is illustrated in FIGURES 16 and 17. It comprises an oscillator unit 1 and a counting unit 2 identical with that in the FIGURE 15 embodiment, but the switching unit 3 comprises three groups of switches 13′ and 13. The group of switches 13′ is fed by the seconds converter 9′, and the two groups of switches 13 are fed by the minutes converter 8 and 9. The three groups of switches 13′ and 13 feed the same display members 7′, **7*b*, but a resistance R (see FIGURE 17) is provided at the output of each switch of one of the groups of switches 13 to produce the difference in brightness between the minutes display and the seconds display. The points X′ of the switches 13′, and the points X of the switches 13 (see FIGURE 17), have applied to them alternating voltages which are 180° out of phase with one another. Thus the switches 13′ and 13 are conductive at different times, which allows the display members 7, 7*b* to be switched alternately between the seconds converter 9′ and the minutes converter 9**.

The groups of switches 13 feeding the other terminal of the display members 7, **7*b* is fed across a simple selective circuit by the two converters 8′ and 8 for seconds and minutes respectively. The said selective circuit is made up of two inputs from the converters 8′ and 8 respectively, each comprising one diode 52, 52′ and the two inputs in parallel feeding the base 53 of a transistor 54 of the switch 13. The points Y′ and Y are coupled to voltages which control the conduction of the diodes 52, 52′, and, more particularly, are energized by alternating voltages 180° out of phase, so that the transistor 54 can be fed by only one of the converters 8′ or 8** at any given moment.

If the display is to be coherent, it is clearly necessary for a given display member **7*b* always to be fed by the appropriate pair of the converters 8′, 8 and 9′, 9, for seconds or for minutes respectively. For this purpose, the alternating voltages applied to the points X′ and Y′ (in switches 13′ and 13 respectively) must be in phase; and those applied to the points X and Y in the two illustrated switches 13 (see FIGURE 17) must also be in phase. In this way, a given display member 7*b*** can be fed by two converters belonging only to the same section, either to the minute or to the second section.

This modification gives an electronic watch having the same performance as that described in reference to FIGURE 15 but using far fewer components, so that the cost price of the watch is reduced.

Moreover, the examples illustrated indicate a way to miniaturize the electronic clock or watch of the present invention, consisting of using separate members which are themselves miniaturized. However, it goes without saying that the various units 1, 2, 3 and 4 could, for example, be formed with the aid of micro-modules or solid or integrated circuits, the functions remaining the same and only the members performing these functions varying from one case to another.

For example, the electronic elements making up the "sandwich" which performs the logical functions of amplification, discrimination, conversion, and oscillation or pulsation, may be formed by micro-modules formed on site on the surface of a base made of an appropriate material. This base may be formed either of a semi-conductive support such as germanium and/or silicon or by an inert support such as ceramic onto which an active surface is evaporated or applied in any other manner, such as electron bombardment, sputtering, electro-deposition, etc.

At certain descrete points on the surface of such a base, pin-point size transistors are formed by any of the numerous present day techniques, such as heat treatment, diffusion of donor centers or of positive or negative donors, bombardment by an electron beam, high temperature or high pressure crystal formation, etc., or by the formation or insertion of micro-electrodes.

Similarly, resistors and capacitors are formed at related positions such as to enable them to cooperate with the other electronic components with a view to forming electrical circuits with all their dimensions on a miniature scale and one of the dimensions (the thickness) limited to a few microns.

The various forms of this circuit may be coupled electrically by stacking, in order to form a multi-layer device (e.g., of the type shown in FIGURE 1), in which the electrical energy and coded or non-coded signals pass from one layer to another so as to fulfill the function and the requirements of a complex circuit.

It is necessary to form an insulating layer between two cooperating active surfaces. However, this insulating layer may be provided with contiguous conductive points operating to interconnect these stacked active surfaces electrically. Each surface has the appearance of a miniature printed circuit. Two or more surfaces thus prepared may be juxtaposed to form a unit, electrically speaking. Two or more films may be "sandwiched" to form any desired kind of complex dividing, counting or display circuit so as to achieve the objects of the desired circuit.

One of the methods used for forming an extra fine insulating layer is to deposit a thin film of a monomeric compound such as methyl methacrylate. At the positions where electrical connections have to be made, and/or where insulation has to be provided, between two juxtaposed active surfaces, appropriate conduction or insulating points are printed with the aid of a suitable screen. The surface is then bombarded with an electron beam. All the surface which is not covered with varnish or with barrier coating is then polymerized and forms a very thin and extremely adhesive insulating surface. Electrical contact is made at the place protected by the non-polymerized coating.

The unit or layer comprising the display surface may have a portion divided into segments formed by radial lines. The base for this micro-module may be a photosensitive compound such as cadmium sulphide. A subjacent layer for activating the photosensitive segment may be formed by a multiplicity of micro-filaments activated by a logical unit. The display surface may be coated with an electro-luminescent material, of which the source of energy is controlled by the conductive state of the material with a photosensitive base.

A practical example of how the "sandwiched" embodiment (FIGURE 1) of the electronic watch is made may include the following successive operations:

A germanium or silicon single crystal is deposited or grown in a vacuum at a well defined point on a thin titanium support. This operation is repeated the same number of times as the number of transistors or diodes required for the oscillating layer 1. Near each point thus treated, micro-films of tantalum are deposited to form the capacitors required by the oscillator circuitry of this oscillating layer 1. Micro-films of carbon, carbon compound or metallic oxides are also deposited to form the necessary resistors as required by the desired oscillator circuit in layer 1.

These metal micro-films may be applied by vapor condensation, by diffusion, by micro-printing, or by a combination of these techniques. The electrical properties of the various components comprising a given circuit in a given layer are controlled by appropriately varying (a) the weight of the material at each vaporization or condensation point; (b) the thickness of the layer deposited; and (c) the subsequent heat and/or chemical treatment and/or electron bombardment.

Points of contact are then deposited by evaporation across a screen at the appropriate points on the active surface in order to form the electrical connections, in accordance with the desired circuits, between the various unitary elements of these circuits which have been formed on the active surface.

A thin film of monomeric butadiene is sprayed over the active surface and this film is masked at certain points with aluminum stearate, at the places where electrical contact is required between the first active surface and the top layer to be deposited later. The layer of butadiene is converted into a micro-layer of electrically insulating material by bombardment with an electron beam, everywhere except at the points marked by the aluminum stearate. This treatment polymerizes the organic butadiene vapors and thus separates and insulates two active superposed layers.

The successive layers are formed and separated from one another by the same methods. Each active layer contains the micro-element required to produce the circuits which have to be formed.

The electro-luminescent display layer has segments of a material which can be energized by electrical stress. This material may be in the form of metal sulphides, such as zinc-sulphide, cadmium sulphide, etc. The surface may be applied by vapor condensation, printing or any other appropriate deposition technique. The surface itself may be protected by a thin film of transparent plastic material, such as acrylic, glass, etc. When the "sandwich" technique described is employed to make a watch, the "sandwich" may be encapsulated in a plastic case and mass produced on an automatic press.

It will be noted that there is great flexibility in the way this electronic watch can be designed. The electrical power used may be derived from a battery, or from power mains oscillating at 50 or 60 cycles per second, or from any other source. The prime oscillator frequency may be derived from the power mains operating at 50 or 60 cycles per second, or may be derived from a crystal oscillator, a maser, or from any other appropriate atomic, telephonic or radiophonic frequency standard, or other frequency standard. In the same way, the display members may comprise lamps, fluorescent tubes, electro-luminescent panels, cathode tubes, gas tubes, numerical tubes or a combination of these.

It is obvious that the electronic watch according to the invention may, in addition to the three oscillator, counting switching and display units 1, 2, 3 and 4 respectively, comprise one or more supply units providing the electricity required both for the operation of the electronic part (oscillation, counting, switching) and for the operation of the display device.

It is also clear that these various units may take very different forms, according to the technique used for making their circuits.

Figure 4:
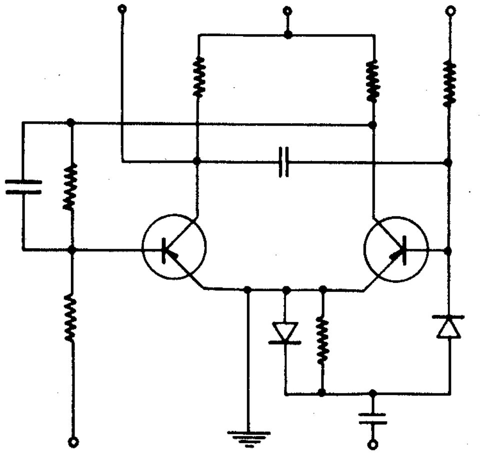
FIGURE 4 is a diagram of one form of zero-return circuit.

In a variant of the electronic circuit as shown in FIGURES 3 and 4, the display also comprises a zero-return device and a setting device. The overall circuit is generally similar to the arrangement already described in reference to FIGURE 2; and this earlier description is accordingly incorporated herein by reference.

The zero-return device comprises an impulse generating circuit 14, of which the output is connected to each of the binary units 5 in groups B, C, D and E of the counting unit. When a switch 15 is closed, the impulse generator 14 enables each of the binary units to be brought into and maintained in a specific state. This state may correspond to any desired time.

By means of this device, the electronic unit can be put in a state corresponding to a specific time, simply by closing the switch 15. The impulse produced by the generator 14 can be triggered manually or automatically, for example, once a day at a time chosen as a reference and representing a time corresponding to the state of the electronic watch imposed by the impulse generator 14. Triggering of the zero-return impulse may be provoked by a high precision time signal transmitted by radio or by wire. This enables the average timing accuracy of the electronic watch to be improved in a case where the watch and particularly the oscillator thereof are less accurate than the time signal controlling the circuit 14.

When the electronic clock in question is a master clock, the zero-return device obviously enables all the slave clocks controlled by the master clock to be returned to zero simultaneously.

As shown in FIGURE 4, the impulse generator 14 may be in the form of a univibrator unit. Other types of miniaturized circuits could obviously be used, provided that they operate similarly.

The device for setting the electronic circuit comprises means for rapidly advancing the time shown. In the example in FIGURE 3, the device is in the form of two switches 16 and 17 which respectively shunt the group A, and the groups A, B and C of the binary counters. If the switch 16 is closed, the impulses of one pulse per second supplied by the oscillator are directly applied to the input of the minute counters. Consequently, the switching of minutes is artificially accelerated and takes place once per second. This enables any desired display to be reached radidly. Similarly, if the switch 17 is closed, the hour shown by the watch is put forward rapidly. It is possible for the minutes or hours shown by the display to be put forward either more or less rapidly, simply by connecting the input of the group B or D respectively, by means of switches 16, 17, to other points in the group A.

This electronic watch may obviously be a master clock and thus pilot or control a plurality of slave clocks. Various types of slave clocks can be provided, as follows:

(1) A slave clock made up only of a display unit, which may be identical with that of the master clock; the slave clock also including a switching unit and a source of power.

A slave clock of this type requires a twenty-four conductor cable connection to the master clock, comprising sixteen conductors for the minutes display, seven conductors for the hours display, and one conductor for the seconds display. Referring to FIGURE 2, this is equivalent to saying that the units 3 and 4 can be separated from the units 1 and 2 and interconnected by an appropriate cable.

The number of slave clocks and their distance away from the master clock are immaterial, provided that there is an adequate remote control device near the master clock. If there is a restricted number of slave clocks, for example, three, at a maximum of about 200 meters from the master clock, the remote control device can be dispensed with. With this type of slave clock there is no re-setting problem, as these always reproduce the exact time shown by the master clock.

The first solution is the most economical and is particularly suitable for an installation comprising a small number of slave clocks close to the master clock.

Figure 5:
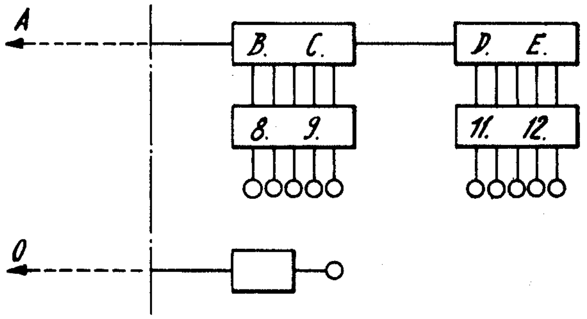
FIGURE 5 is a block diagram showing schematically one embodiment of the present invention using slave clocks.

A second variant is as follows:

(2) A slave clock (FIGURE 5) comprising a counting unit, a switching unit, a display unit and a source of electricity. Each clock has elements similar to the units 2, 3 and 4 of the master clock although the unit 2 includes only the groups B, C, D and E.

A slave clock of this type need be connected to the master clock only by a two wire cable, one wire connecting the output of the group A to the input of the group B of the counting layer, and the other wire being provided for the seconds indicator. This is very advantageous, particularly for installation with slave clocks far away from the master clock. Here in fact there is no need for a remote control device.

It should be noted that the display method used by the slave clock of this type may vary between the clocks and be different from that used by the master clock. It is also possible to set the time or to return it to zero by sending impulses along one of the wires connecting the slave clock to the master clock.

Figure 6:
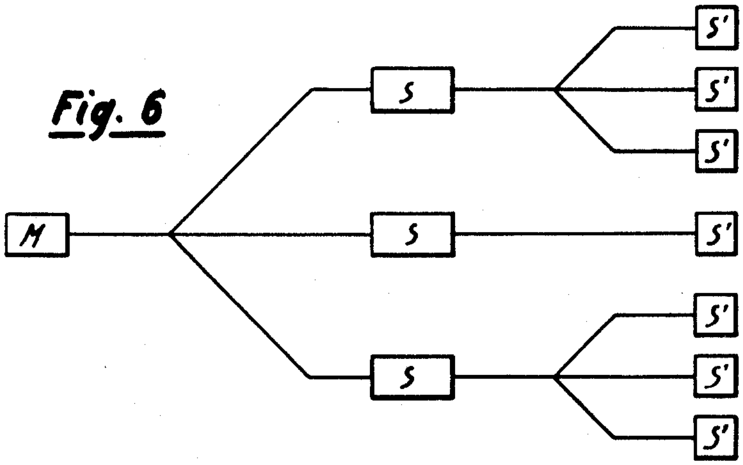
FIGURE 6 is a block diagram showing a different embodiment using slave clocks.

A third variant is as follows:

(3) The third solution (FIGURE 6) is a combination of the two above solutions, that is to say, the second variant used for controlling slave clocks S, in turn controls each of the repeater clocks S' by the first variant described.

This third, hybrid solution makes it possible for one master clock M to control numerous slave clocks which may be remote from the master clock.

In addition to the three possibilities described above, it is also possible to control slave clocks by means of coded information. The information provided by the outputs of the converters 8, 9, 11 and 12 may be coded, transmitted, and then decoded at each slave unit to control a slave clock.

Two examples of coded transmission for controlling secondary clocks will be described below by way of example. In each of these examples it will be assumed that the oscillator unit 1, the counting unit 2 and the conversion unit 3 are identical to those described with reference to FIGURE 2.

(a) Coding by means of different level.

In this embodiment (FIGURES 7, 8, 10, 11) a four-wire connection is used between the master clock and the slave clock, each of the four wires being assigned to one of the converters 8, 9, 11 and 12. The ten outputs of the converter 8 are connected to a switching device 18, which supplies a wire 19 with direct voltage which varies according to which of the outputs of the converter 8 is being fed. The commutation device 18 has ten circuits 20 (FIGURE 10) which are connected in parallel and which each supply the wire 19 with a different voltage, for example, graduated between 5 and 15 volts, each circuit being controlled by one of the outputs of the converter 8.

The output of the converters 9, 11 and 12 are connected to a transmission wire 21, 22 and 23 by switching devices 24, 25 and 26, respectively, similar to the device 18. Each of the devices 24, 25 and 26 count as many circuits 20 (FIGURE 10) as the corresponding converter has outputs.

Thus coded information is obtained along the wires 19, 21, 22 and 23 in the form of discrete voltages with ten different values ranging, for example, from 5 to 15 volts along the wire 19, six different values ranging, for example, from 5 to 11 volts along the wire 21, four distinct values ranging, for example, from 5 to 9 volts along the wire 22, and three distinct values ranging from 5 to 8 volts along the wire 23.

Figure 11:
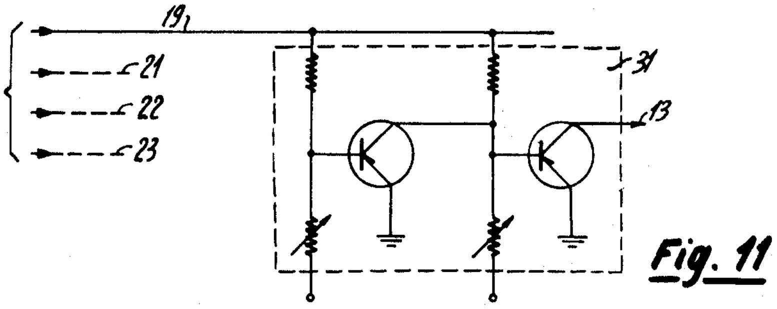

It is possible to transmit all the information required to control a slave clock by the different voltages. Each of the transmission wires 19, 21, 22 and 23 terminates at a demodulation or decoding device 27 to 30, comprising ten, six, four and three circuits 31 respectively (FIGURE 11). The outputs of these amplitude discriminator circuits 31 are similar to the outputs of the converters 8, 9, 11 and 12 and control the switching unit 3 and the display unit 4 of the slave clock in a manner similar to that shown in FIGURE 2.

It is also possible to superimpose an alternating signal on one of the wires 19, 21, 22, 23 to indicate seconds. This may be done by means of a transformer 32 as shown in FIGURE 7. This alternating signal is then taken from the wire in question by means of a capacitor 33 and is used to operate the device 34, which in turn operates a seconds display device 35. The seconds display device 35 may, for example, be in the form of a miniature incandescent lamp.

(b) Coding by means of impulses:

The clock diagram in FIGURE 9 illustrates how the indications provided by the converters of the master clock for operating the slave clock can be coded by means of impulses.

This figure shows a carrier frequency generator 36 supplying a coding device 37. The coding device 37 received information relating to minutes display through the outputs of the converters 8 and 9 and information relating to hour display through the seven outputs of the converters 11 and 12.

The coding device 37 transforms this information into coded impulses. The coded impulses are then transmitted to a decoding device 44 by means of six wires, for informations relating to minutes and two for informations relating to hours. This device generates 23 output signals equivalent to those supplied by the converters 8, 9, 11, 12 and the signals are used to actuate a switching unit and a display unit, for example of the type illustrated in FIG. 2.

If positive and negative impulses are used, it is possible to double the transmission capacity and also to transmit two messages simultaneously, or to transmit the coded signals as radio broadcasting signals.

Figure 12:
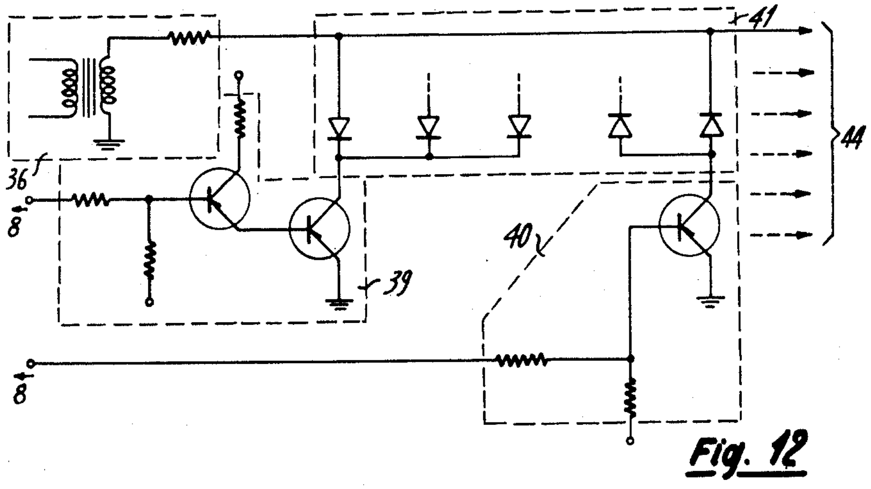
Figure 13:
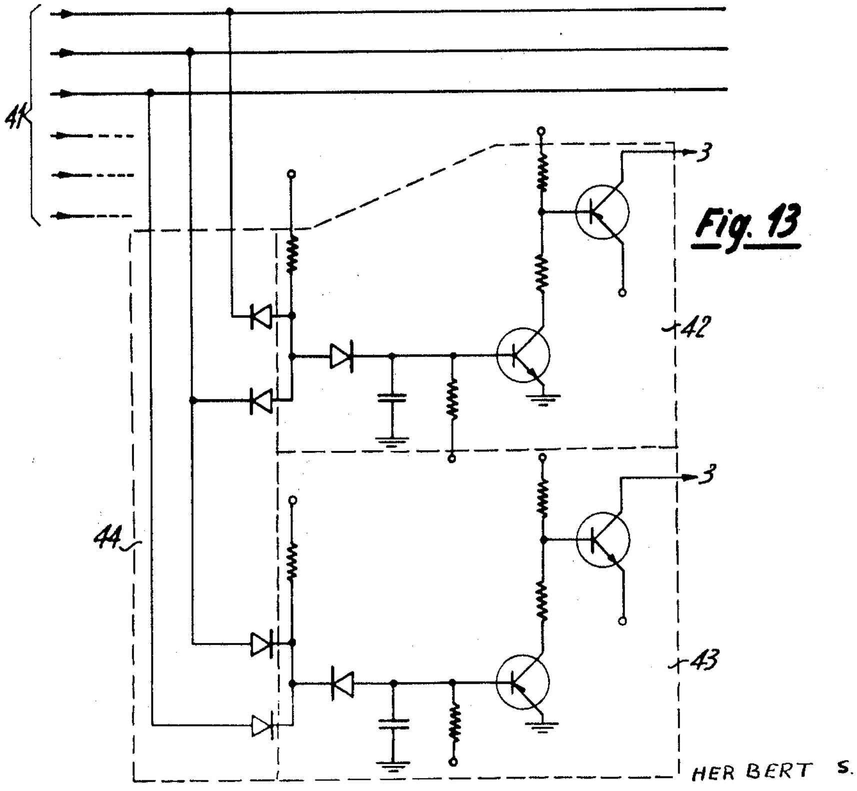

In the examples illustrated in FIGS. 12 and 13, the coding device 37 has ten positive impulse generators 39 and six negative impulse generators 40 to produce the coded informations relating to minutes, and four positive impulse generators 39 and three similar negative impulse generators 40 to produce the coded informations relating to hours.

Each of the impulse generators supplies 1 to 4 of the transmission wires through a coding matrix 41 having about 60 diodes. This is decided when the desired code has been chosen. The coding device 44 (FIG. 13) has sixteen positive switching circuits 42 and seven negative switching circuits 43, each of which is fed by 1 to 4 of the transmission wires through a decoding matrix 44 having about 60 diodes. The output of the 23 circuits 42 and 43 provide signals corresponding to those emitted by the converters 8, 9, 11 and 12 and make it possible to feed a switching unit 3 and a display unit 4 of the type described in FIG. 2.

Obviously, although all the circuits described above with references to the devices controlling the slave clocks are illustrated in conventional form, they could also be made by one or other of the above-mentioned miniaturization techniques.

Having thus described my invention, I claim:

1. A solid state electronic time measuring and display system comprising a prime frequency source, transistorized counter means comprising a plurality of different scale counters connected in series with one another, means coupling the output of said prime frequency source to the input of said counter means, said series connected counters including means for counting minutes comprising at least one counter circuit having a counter section for counting in the scale of A and a further counter section for counting in the scale of B, where A and B are each greater than unity and the product of A and B equals sixty, said series connected counter also including means for counting hours comprising another counter circuit having a counter section for counting in the scale of C and a further counter section for counting in the scale of D, where C and D are each greater than unity and the product of C and D equals twelve, said counter sections respectively having A, B, C, and D electrical outputs selectively energized in sequence in accordance with the count state of their associated counter section, display means comprising a first minutes display section and a second hours display section, each of said first and second display sections including a plurality of elements comprising selectively light emissive means responsive to electrical energization thereof, and switching matrix means interconnecting the outputs of said plurality of counter sections with said plurality of elements to variably energize different ones of said elements in accordance with the different scale minutes and hours outputs of said plurality of counters thereby to obtain a visual time indication display, said matrix means including connections connecting said A outputs to a first preselected array of the display elements in said first minutes display section and connecting said B outputs to a different preselected array of the display elements in said first minutes display section whereby a selected one of the display elements in said first minutes display section is uniquely energized in dependence upon which of said A and B outputs are energized at any particular time, said matrix means also including connections connecting said C outputs to a first preselected array of the display elements in said second hours display section and connecting said D outputs to a different preselected array of the elements in said second hours display section whereby a selected one of the display elements in said second hours display section is uniquely energized in dependence upon which of said C and D outputs are energized at any particular time, thereby to provide a time display in minutes and hours.

2. The system of claim 1 including means for selectively resetting said visual time indication, said resetting means comprising control means for selectively applying high frequency electric resetting signals to at least one of said counters thereby to alter the count output of said counter at a rate in excess of that which would normally be effected in said one of said counters by signals derived from said prime frequency source.

3. The system of claim 1 wherein said prime frequency source and counter means comprises a portion of a master clock, said display means comprising a portion of a slave clock located at a position remote from said master clock, said switching matrix means including a cable interconnecting said master and slave clocks.

4. The system of claim 1 wherein said system comprises a watch, said prime frequency source comprising a first thin layer of semi-conductive material fabricated as a micro-module electronic circuit operative to produce output signals at a preselected repetition rate, said transistorized counter means comprising at least a second thin layer of semi-conductive material fabricated as a micro-module to provide each of said counter sections as a unitary portion of said second layer, said switching matrix comprising at least a third thin layer of semiconductive material fabricated as a micro-module to perform a switching function, and said display means comprising at least a fourth thin layer of semi-conductive material fabricated as a micro-module having spaced selectively energizable light emissive portions, said first, second, third and fourth layers of semi-conductive material being stacked upon one another in a sandwich configuration, and conductive means interconnecting preselected spaced portions of said stacked semi-conductive layers to one another whereby the circuits of said different layers coact with one another to provide said minutes and hours time display.

5. The system of claim 4 including casing means encapsulating said stacked layers into a unitary body.

6. The system of claim 1 wherein each of said display elements comprises a miniature incandescent lamp, and means mounting said plurality of incandescent lamp display elements in a substantially circular array.

7. A solid state electronic time measuring and display system comprising a prime frequency source, a first thin layer of semi-conductive material fabricated to function as an oscillator and connected electrically to said prime frequency source, counter means comprising at least a second thin layer of semi-conductive material fabricated to provide a plurality of transistors interconnected to one another to perform a counting function operative to generate output signals at rates related to minutes and hours, switching matrix means comprising at least a third thin layer of semi-conductive material fabricated to perform a switching function, display means comprising at least a fourth thin layer of semi-conductive material having spaced selectively energizable light emissive portions for providing a minutes and hours display, said first, second, third and fourth layers being stacked upon one another in directly adjacent superposed relation to one another, conductive means interconnecting preselected spaced portions of said stacked first and second semi-conductive layers to one another, interconnecting preselected spaced portions of said stacked second and third semi-conductive layers to one another, and interconnecting preselected spaced portions of said stacked third and fourth semi-conductive layers to one another whereby the circuits of said different layers coact with one another to give a visual light emitting time indication in minutes and hours, and means for selectively resetting said time indication comprising auxiliary signal means in the circuit of said first layer selectively coupled to a portion of the counter means in said second layer for selectively accelerating the count of said counter means.

8. In a solid state electronic time measuring and display system, counter means comprising a plurality of transistor bistable devices interconnected into a plurality of series connected binary counters, selected ones of said binary counters including feedback means for varying the normal counting scale of said counter whereby a first portion of said interconnected counters counts at a first scale related to minutes and a second portion of said interconnected counters counts at a second and different scale related to hours, each of said counters including a plurality of outputs, display means comprising a first plurality of light emissive elements mounted in a preselected first physical array, and a second plurality of light emissive elements mounted in a preselected second physical array adjacent to said first array, each of said light emissive elements in said arrays having first and second spaced terminals which must be concurrently energized to activate said light emissive elements, means for grouping the light emissive elements in each of said arrays, said grouping means comprising means interconnecting the first terminals of selected different ones of the elements in said first array, means interconnecting the second terminals of selected different ones of the elements in said first array, means interconnecting the first terminals of selected different ones of the elements in said second array, and means interconnecting the second terminals of selected different ones of the elements in said second array, a first switching matrix interconnecting different pairs of outputs from said first counter portion with different interconnected ones of said first and second terminals respectively in said first array thereby to selectively vary the energization of the display elements in said first array in accordance with the minutes count of said first counter portion, and second switching matrix means interconnecting different pairs of outputs from said second counter portion with different interconnected ones of said first and second terminals respectively in said second array thereby to vary the energization of the display elements in said second array in accordance with the hours count of said second counter portion.

9. The system of claim 8 wherein second counter portion includes first means for producing a plurality of first output signals related respectively to predetermined different segments of a day and second means producing a plurality of second output signals related to different preselected portions of each said segment, said second switching matrix means including means coupling different ones of said first and second signals to different ones of the interconnected first and second terminals in said second array respectively.

10. The system of claim 8 wherein said interconnected counters include a third portion arranged to count at a scale related to seconds, and means for selectively displaying the count of said third counter portion.

11. The system of claim 10 wherein said means for displaying the count of said third counter portion comprises switch means interconnecting said first array of display elements to both said first counter portion and to said third counter portion, and means for selectively operating said switch means at a rate sufficiently high to take advantage of the visual persistence of the human eye thereby to display the minutes count output of said first counter portion and the seconds count output of said third counter portion substantially simultaneously on said first array of display elements.

12. A multi-layer solid state horologe comprising a first solid state layer fabricated to function as an oscillator, a second solid state layer fabricated to perform pulse counting functions operative to produce output signals related to at least minutes and hours, said first and second solid state layers each comprising a ceramic supporting structure having doped germanium deposited thereon in integrated electronic circuit configurations, switching means comprising at least a third solid state layer including a layer of insulating material of a monomeric composition having a conductive switching matrix pattern formed as an integral part thereof, and time display means comprising at least a fourth solid state layer having an electro-luminescent material thereon, said first, second, third and fourth layers being stacked upon one another in a sandwich configuration and having preselected spaced portions of said stacked layers conductively interconnected to one another and having other preselected spaced portions of adjacent ones of said stacked layers insulated from one another whereby said different layers coact with one another to give a visual light emitting time indication in at least minutes and hours.

References Cited by the Examiner

UNITED STATES PATENTS

| | | | |
|---|---|---|---|
| 2,410,156 | 10/46 | Flory | 58—26 |
| 3,003,305 | 10/61 | Goldman | 58—50 |
| 3,054,929 | 9/62 | Livingston | 315—169 |
| 3,066,287 | 11/62 | Matarese | 340—347 |

LEO SMILOW, *Primary Examiner.*